(12) United States Patent (10) Patent No.: US 8,767,725 B2
Chang et al. (45) Date of Patent: Jul. 1, 2014

(54) BACKPLANE MODULE

(75) Inventors: Tsun-Yao Chang, Roseville, CA (US); David G. Rohrer, Auburn, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 126 days.

(21) Appl. No.: 13/451,686

(22) Filed: Apr. 20, 2012

(65) Prior Publication Data

US 2013/0279501 A1 Oct. 24, 2013

(51) Int. Cl.
*H04L 12/50* (2006.01)

(52) U.S. Cl.
USPC ........................................................ 370/386

(58) Field of Classification Search
USPC .......... 370/380, 386, 427; 455/128, 347–349, 455/571.1; 361/728, 735, 748, 752
See application file for complete search history.

(56) References Cited

U.S. PATENT DOCUMENTS

| 5,761,797 | A | 6/1998 | Besserer et al. |
| 6,970,349 | B2 | 11/2005 | Szolyga |
| 7,554,796 | B2 | 6/2009 | Coffey et al. |
| 7,780,455 | B2 | 8/2010 | Leigh et al. |
| 7,885,082 | B2 | 2/2011 | Eshel |
| 8,009,438 | B2 | 8/2011 | Leigh et al. |
| 8,102,656 | B2 | 1/2012 | Bender |
| 2004/0141285 | A1* | 7/2004 | Lefebvre et al. ............... 361/683 |
| 2007/0238326 | A1* | 10/2007 | Fallah-Adl et al. ............. 439/67 |

FOREIGN PATENT DOCUMENTS

| CN | 201319473 | 9/2009 |
| CN | 201904562 | 7/2011 |
| CN | 202004326 | 10/2011 |
| CN | 202009166 | 10/2011 |
| CN | 102263383 | 11/2011 |

* cited by examiner

*Primary Examiner* — Frank Duong

(57) ABSTRACT

Modules, modular devices, and modular systems are provided. Some examples include a backplane oriented in a first plane, a first module including a major surface oriented parallel to the first plane and a first minor surface oriented perpendicular to the first plane, wherein the major surface of the first module includes a connector thereon that releasably mates with a corresponding connector located on a first side of the backplane. Some examples include a second module including a major surface oriented perpendicular to the first plane and a first minor surface oriented parallel to the first plane, wherein the first minor surface of the second module includes a connector thereon that releasably mates with a corresponding connector located on a second side of the backplane. Circuitry within the first module can provide interconnections for the second module. The first and second modules can be fabric and interface modules, respectively.

15 Claims, 3 Drawing Sheets

BACKPLANE MODULE

BACKGROUND

In various instances, physical interconnections between devices in a computing network are made via networking systems installed in a particular location, which may be referred to as a wiring closet. A wiring closet can be a relatively small space/room, which can house various networking systems and/or devices such as switches, servers, bridges, routers, etc. As an example, a wiring closet may include a physical framework (e.g., a chassis) to which the various networking systems and/or devices may be attached.

Access to networking systems within a wiring closet is useful for purposes such as upgrading system components, trouble-shooting networking issues, and/or replacing failed system components. Some networking systems include removable modular components, which can provide a convenient manner of assembly and change out of components.

DETAILED DESCRIPTION

Due to limited space constraints often associated with a wiring closet, the size (e.g., height, width, and/or depth) of networking systems and/or components housed in wiring closet are considered in product design. The serviceability of networking systems and/or components housed in a wiring closet environment can also be a concern. Various networking system designs provide modular system components, which can provide serviceability (e.g., due to the ability to access and update or remove/replace such components). However, modularity of such designs often comes at the expense of product size (e.g., the modularity of the system components increases the overall size of the networking system).

Figure 2:
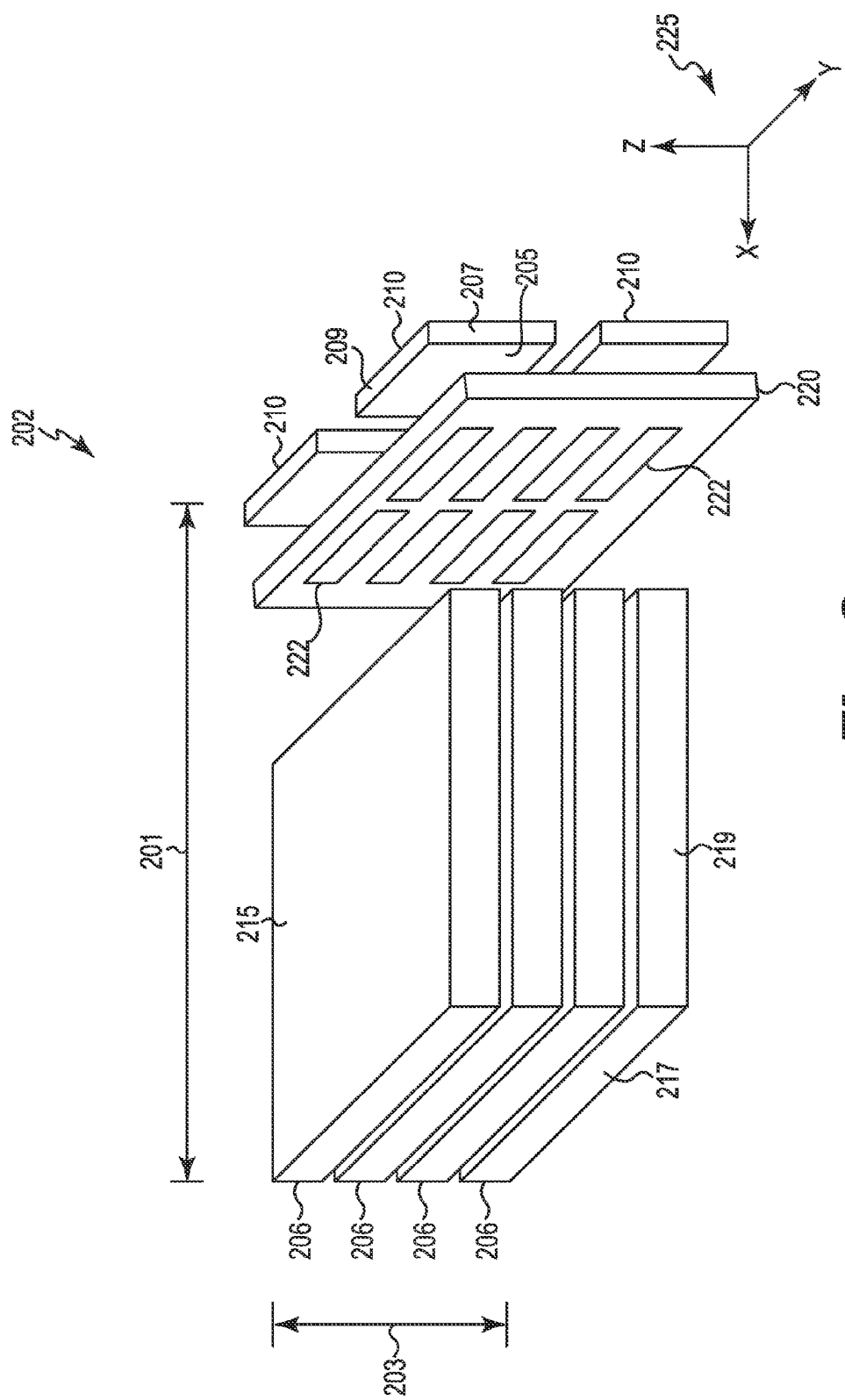
FIG. 2 illustrates a block diagram of an example of a device having a modular configuration according to the present disclosure.

As an example, some networking system configurations include a backplane that is fixed to a chassis, as well as a number of modular system components (e.g., various types of physical modules and/or "cards") configured to connect to the backplane (e.g., via a connector that releasably mates with a corresponding connector on the backplane). Such physical modules often have a three-dimensional quadrilateral "box" shape (e.g., having two major rectangular or square surfaces/faces opposite each other and four minor surfaces/faces). An example of a physical module shape is shown in FIG. 2 (e.g., module 206).

A backplane can take the form of a printed circuit board (PCB), for example, and can be used to distribute power and/or electrical and/or optical signals to devices attached thereto (releasably or fixedly). The electrical and/or optical signals can be, for instance, control and/or data signals transported by the backplane and used for various purposes including monitoring, control, and management, among others.

Backplane designs can take various forms. For example, some backplane, which may be referred to as "passive" backplanes, may lack certain circuitry (e.g., a microprocessor, controller, arbitration logic). Therefore a passive backplane may add little or no driving and/or processing capability to a system. As such, networking systems employing a passive backplane often include such additional components on modules such as fabric modules (e.g., switching fabric modules), which may be referred to as "backplane modules," that connect to (e.g., plug-in to) the backplane. On the other hand, "active" backplanes often include circuitry such as driving and/or arbitration logic therein. Therefore, active backplanes can be more complex than passive backplanes, which can result in a higher likelihood of malfunction or failure as compared to passive backplane designs.

Since passive backplanes lack components to upgrade and/or replace as compared to active backplanes, the overhead (e.g., time and resources) associated with servicing or replacing an active backplane can be reduced. However, having to provide additional external modules to provide the functions of an active backplane can have drawbacks such increasing the physical size of the system, or reducing the amount of space available for other modules (e.g., networking interface modules, routing modules, etc.). Increasing the physical size of a system may violate space constraints associated with wiring closets, for example.

Some networking systems include an active backplane that is fixed to a chassis (e.g., at the rear of the system in a vertical orientation). Interface modules, which can provide a plurality of networking ports, for instance, can connect to the front of the backplane. As mentioned above, the modules can have a three-dimensional quadrilateral shape with rectangular or square major surfaces. In this example the interface modules perpendicularly connect to the front of the backplane. For instance, the interface modules include connectors on one of their minor surfaces which releasably mates with a corresponding connector on the backplane such that, when installed, the major surfaces of the modules are oriented in planes perpendicular to the plane in which the backplane is oriented. Since the backplane is an active backplane, the use of external switching fabric modules to provide interconnections between the interface modules of the system may be avoided. However, since the switching fabric of the active backplane is non-modular, a hardware failure associated with that portion of the system may require the entire chassis to be taken off-line (e.g., disconnected) for repair/replacement. Therefore, such networking systems may be deployed in environments in which connectivity is non-critical.

Some networking systems include a passive backplane that is fixed at the rear of the system in a vertical orientation and that provides the capability for both interface modules and fabric modules to be perpendicularly connected (e.g., plugged-in) to the front of the backplane. Therefore, front access service is provided for both the interface modules and fabric modules. The modularity of the fabric modules can provide for improved serviceability as compared to the above described active backplane system. However, the inclusion of the fabric modules on the front side of the backplane has drawbacks. For example, consider a wiring closet environment having a fixed height, width, and depth. Also consider a desire to include a maximum amount of interface modules (e.g., networking ports such as Ethernet ports) within the wiring closet. In order to accommodate the fabric modules on the front side of the backplane, available space for interface modules must be sacrificed in order to comply with the physical size constraints of the closet. Therefore, the port density provided by such systems may not meet desired requests/needs of a customer, for example.

Some networking systems provide a vertically oriented passive backplane design with interface modules perpendicularly connecting to the front of the backplane and fabric modules perpendicularly connecting to the rear of the backplane. As described above, a perpendicular connection refers to a connection in which the major surfaces/faces of the module are oriented in planes perpendicular (e.g., orthogonal) to a plane in which the backplane is oriented. Such networking systems provide serviceability for both the front installed and rear installed modules while providing for maximum networking port density on the front of the system. That is, space on the front of the backplane for interface modules is does not need to be sacrificed for fabric modules as in the example described above in which both the interface and fabric modules are front installed. However, the perpendicular connection of modules on both the front side and back side of the backplane significantly increases the depth of the networking system as compared to the previously described systems, which may violate the space constraints of a wiring closet, for instance.

Examples of the present disclosure include modules, modular devices, and modular systems that can provide benefits such as improved serviceability and a reduced form factor as compared to previous networking system configurations such as those described above, for instance. As described further below in connection with FIGS. 1-3, some examples include a backplane oriented in a first plane, a first module (e.g., a fabric module) including a major surface oriented parallel to the first plane and a first minor surface oriented perpendicular to the first plane, wherein the major surface of the first module includes a connector thereon that releasably mates with a corresponding connector located on a first side of the backplane. Some examples include a second module (e.g., an interface module) including a major surface oriented perpendicular to the first plane and a first minor surface oriented parallel to the first plane, wherein the first minor surface of the second module includes a connector thereon that releasably mates with a corresponding connector located on a second side of the backplane.

In the following detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure. As used herein, "a number of" can refer to one or more of a particular thing. For example, a number of modules can refer to one or more modules.

The figures herein follow a numbering convention in which the first digit or digits correspond to the drawing figure number and the remaining digits identify an element or component in the drawing. Similar elements or components between different figures may be identified by the use of similar digits. For example, 110 may reference element "10" in FIG. 1, and a similar element may be referenced as 210 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

Figure 1:
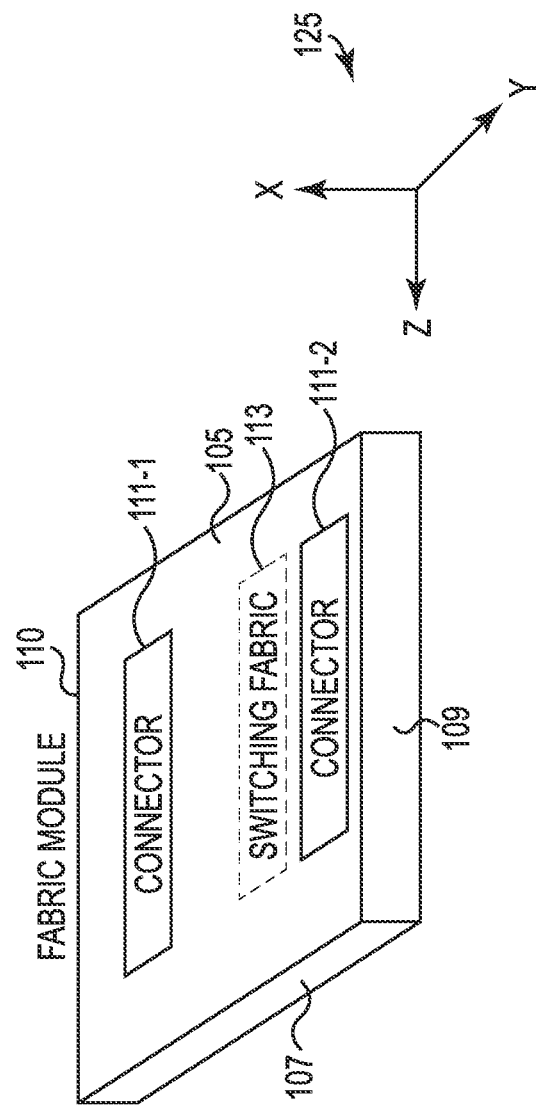
FIG. 1 illustrates an example of a module according to the present disclosure.

FIG. 1 illustrates an example of a module 110 according to the present disclosure. In the example shown in FIG. 1, the module 110 is a fabric module 110. As such, the fabric module 110 includes switching fabric 113 therein. The switching fabric 113 can include switching fabric circuitry such as cross-bar switching logic associated with providing interconnections between a number of other modules (e.g., networking interface modules, management modules, other fabric modules, etc.), which may be releasably connected to a backplane, for instance. The switching fabric may be used to replace a bus, or may be used in addition to a bus.

The module 110 includes a major surface 105 oriented in a first plane (e.g., the Y-Z plane according to coordinate axes 125), a minor surface 107 oriented in a second plane (e.g., the X-Y plane) orthogonal to the first plane, and a minor surface 109 oriented in a third plane (e.g., the X-Z plane) orthogonal to the first and second planes. Although not labeled in FIG. 1, the reader will appreciate that the module 110 includes a major surface opposite surface 105 and minor surfaces opposite surfaces 107 and 109, respectively.

The major surface 105 of module 110 includes connectors 111-1 and 111-2 thereon. The connectors 111-1 and 111-2 are configured to releasably mate with corresponding connectors of a backplane (e.g., a vertically oriented backplane such as backplane 220 shown in FIG. 2). That is, the fabric module 110 is configured for parallel connection to a backplane as part of a networking system within a wiring closet, for instance. Parallel connection to a backplane refers to the fact that the major surface of a module (e.g., surface 105 of module 110) is oriented in a plane that is parallel to a plane in which the backplane is oriented. Unlike the fabric modules of previous networking systems, the module 110 does not include connectors on its minor surfaces/faces (e.g., surfaces 107 and 109).

Providing modules, such as module 110, which are configured for parallel connection to a backplane has various benefits. For instance, as described below in connection with FIG. 2, parallel connections of fabric modules 110 can reduce the physical depth of a networking system as compared to systems in which modules are perpendicularly connected to the backplane. Additionally, the location of the connectors (e.g., 111-1/111-2) on a major surface of the module allows for increased connector flexibility as compared to modules in which the connectors are located on the minor surface(s). For instance, the switching fabric circuitry can be complex and can include numerous physical traces used to provide interconnections between interface modules, for example. The increased surface area associated with a major surface (e.g., 105), as opposed to a minor surface, allows flexibility with respect to the number of connectors that are able to fit on the surface of the module, the types of connectors, as well as how the connectors are arranged on the module, among other benefits.

FIG. 2 illustrates a block diagram of an example of a device 202 having a modular configuration according to the present disclosure. The device 202 can be a networking device such as a network switch that can be part of a network infrastructure that comprises both wired and wireless networking devices and/or systems. The device 202 includes a backplane 220. In this example, the backplane 220 is a passive backplane and is vertically oriented in the Y-Z plane (e.g., as indicated by coordinate axes 225).

The device 202 comprises a first number of modules 206 that releasably connect to a front side of the backplane 220 and a second number of modules 210 that releasably connect to the rear (e.g., back side) of the backplane 220. In this example, the modules 206 have a three-dimensional quadrilateral shape (e.g., rectangular or square) such that each include a major surface 215 (oriented parallel to the X-Y plane) and minor surfaces 217 (oriented parallel to the Y-Z plane) and 219 (oriented parallel to the X-Z plane). As the reader will appreciate, each module 206 includes a major surface opposite surface 215 and minor surfaces opposite surfaces 217 and 219, respectively.

Although not shown in FIG. 2, the modules 206 include connectors on their minor surfaces (e.g., the minor surfaces opposite surface 217) that releasably mate with corresponding connectors 222 on the backplane 220. As such, the modules 206 are configured for perpendicular connection to the backplane 220. For instance, major surface 215 of a module 206 is oriented parallel to the X-Y plane, which is perpendicular to the Y-Z plane (e.g., the plane in which the backplane 220 is oriented).

As an example, the modules 206 can be interface modules. Although not illustrated in FIG. 2, in some such examples, the interface modules 206 can include a number of networking ports. The networking ports can be located on minor surface 217, for instance, and can be used as connection points to various devices such as personal computers (PCs), servers, routers, switches, printers, etc.

The modules 210, which connect to the rear of backplane 220, can be fabric modules such as fabric modules 110 described in FIG. 1. As shown in FIG. 2, the modules 210 have a three-dimensional quadrilateral shape and are configured for parallel connection to the backplane 220. Although not shown in FIG. 2, the modules 210 include connectors on their major surfaces 205 (e.g., such as connectors 111-1/111-2 shown in FIG. 1) that releasably mate with corresponding connectors 222 on the rear of backplane 220. In this example, the minor surfaces of the modules 210 do not include connectors thereon connecting to the backplane 220.

In this example, the major surface 205 (and its corresponding major surface) is oriented in a plane parallel to the plane (e.g., the Y-Z plane) of the backplane 220. The minor surface 207 (and its corresponding minor surface) is oriented parallel to the X-Z plane, and the minor surface 209 (and its corresponding minor surface) is oriented parallel to the X-Y plane.

The modules 210 can include, for example, switching logic used to provide interconnections between the interface modules 206 and/or the networking ports thereof. The device 202 has a depth 201 that can be less than previous networking devices while maintaining a desired height 203, serviceability, and port density. For instance, since the modules 210 are configured for parallel connection to backplane 220, the depth 201 of device 202 is less than a device comprising modules configured for perpendicular connection to front of backplane 220 and modules configured for perpendicular connection to the back of backplane 220. The reduced depth associated with device 202 can be desirable for deployment in wiring closet environments, for instance. Since the fabric modules 210 are connected to the back of the backplane 220, a desired port density can be achieved without increasing the height 203 of device 202 in contrast to devices in which both the fabric modules 210 and interface modules 206 are connected to the front of the backplane 220. Moreover, as discussed above, parallel connection of fabric modules (e.g., 210) to a backplane (e.g., 220) can provide for an increased flexibility with respect to the physical arrangement of connectors on the fabric modules, among other benefits.

Figure 3:
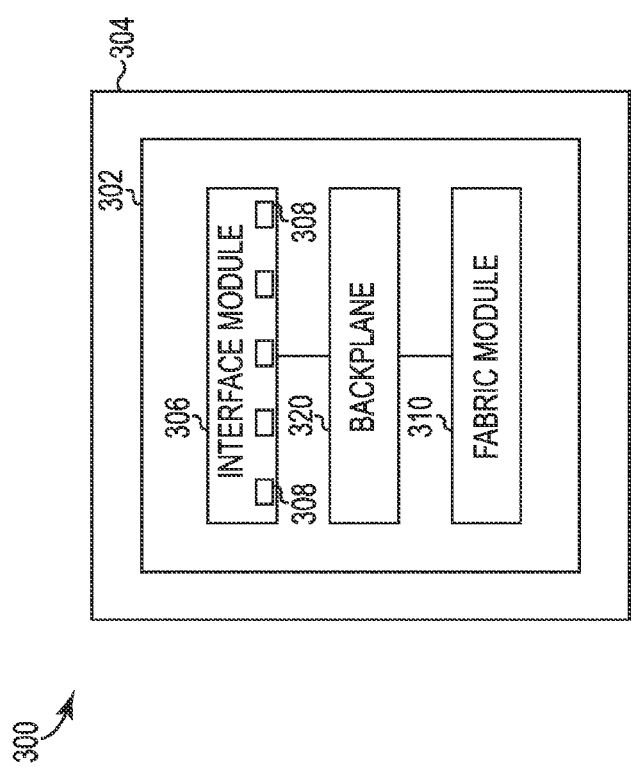
FIG. 3 illustrates a block diagram of an example of a system including a device having a modular configuration according to the present disclosure.

FIG. 3 illustrates a block diagram of an example of a system 300 including a device 302 having a modular configuration according to the present disclosure. The device 302 can be a device analogous to device 202 described above. In this example, the system 300 includes a system enclosure 304 (e.g., a chassis) to which the device 302 can be attached. The system 300 can be a networking system located within a wiring closet, for instance.

The device 302 includes an interface module 306, a fabric module 310, and a backplane 320. The backplane 320 can be a passive backplane and can be fixed within device 302 in a vertical orientation; however, examples are not limited to a particular orientation. Also, although a single interface module 306 and a single fabric module 310 is shown in FIG. 3, examples of the present disclosure are not limited to a particular number of interface modules 306 and/or fabric modules 310.

As described herein, the interface module 306 can be releasably connected to the backplane 320 in a perpendicular configuration, and the fabric module 310 can be releasably connected to the backplane 320 in a parallel configuration. The interface module 306 can include a number of networking ports located on a minor surface thereof and which can serve, for instance, as access points to a network in which system 300 is deployed. As shown in FIG. 1, the fabric module 310 can include circuitry therein (e.g., switching fabric logic) that con provide interconnections between the number of interface modules 306 and/or networking ports 308 thereof via the backplane 320.

System 300 can provide various benefits as compared to prior art networking systems. As an example, the system 300 can have a reduced form factor as compared to previous networking systems while maintaining a desired system port density and serviceability. The parallel connection of the fabric modules 310 to the backplane 320 can also provide flexibility with respect to arrangement and configuration of the connectors on the major surface thereof as well as of the switching fabric logic used to provide the interconnections for the interface modules 306, among other benefits.

It is to be understood that the above description has been made in an illustrative fashion, and not a restrictive one. Although specific examples have been illustrated and described herein, other component arrangements, instructions, and/or device logic can be substituted for the specific examples shown.

What is claimed:

1. A module, comprising:
a major surface oriented in a first plane, a first minor surface oriented in a second plane perpendicular to the first plane, and a second minor surface oriented in a third plane perpendicular to the first plane;
a number of connectors located on the major surface to releasably connect to a first major surface of a backplane, wherein the first major surface of the backplane is oriented in a plane parallel to the first plane, wherein a second major surface of the backplane includes a number of connectors thereon, and wherein the first major surface of the backplane is different than the second major surface of the backplane;
circuitry within the module to provide interconnections between a number of releasable interface modules via the backplane.

2. The module of claim 1, wherein the module is a switching fabric module and the circuitry comprises switching fabric circuitry.

3. The module of claim 1, wherein the first and second minor surfaces do not have connectors located thereon.

4. The module of claim 1, wherein the module comprises a third minor surface oriented parallel to the second plane and a fourth minor surface oriented parallel to the third plane.

5. The module of claim 1, wherein the number of connectors located on the major surface is at least two.

6. A device, comprising:
a backplane oriented in a first plane;
a first module including a major surface oriented parallel to the first plane and a first minor surface oriented perpendicular to the first plane, wherein the major surface of the first module includes a connector thereon that releasably mates with a corresponding connector located on a first major surface of the backplane; and a second module including a major surface oriented perpendicular to the first plane and a first minor surface oriented parallel to the first plane, wherein the first minor surface of the second module includes a connector thereon that releasably mates with a corresponding connector located on a second major surface of the backplane;

wherein the first major surface of the backplane is different than the second major surface of the backplane; and wherein circuitry within the first module provides interconnections for the second module.

7. The device of claim 6, wherein the backplane is a passive backplane.

8. The device of claim 6, wherein the device is a networking device, the first module is a switching fabric module, and the second module is an interface module.

9. The device of claim 8, wherein the interface module includes a second minor surface oriented parallel to the first plane and having a number of networking ports located thereon.

10. The device of claim 8, wherein the first side of the backplane is a back side of the backplane and the second side of the backplane is a front side of the backplane.

11. The device of claim 6, wherein the major surface of the second module does not include a connector located thereon to releasably mate with a corresponding connector located on the backplane.

12. The device of claim 6, wherein the first module includes a second, a third, and a fourth minor surface oriented perpendicular to the first plane, and wherein none of the first, the second, the third, and the fourth minor surfaces of the first module include a connector to mate with a corresponding connector located on the backplane.

13. The device of claim 6, wherein at least one of the first module and the second module has a three-dimensional rectangular shape.

14. A system, comprising:
a system enclosure;
a backplane oriented in a vertical plane and fixed within the system enclosure;
a number of interface modules each including a major surface oriented parallel to the vertical plane and a number of minor surfaces oriented perpendicular to the vertical plane, wherein the major surface of the number of interface modules includes a connector thereon that releasably mates with a corresponding connector located on a first major surface of the backplane; and
a number of fabric modules each including a major surface oriented perpendicular to the vertical plane and a number of minor surfaces oriented parallel to the vertical plane, wherein at least one of the first minor surfaces of the number of fabric modules includes a connector thereon that releasably mates with a corresponding connector located on a second major surface of the backplane;
wherein the first major surface of the backplane is different than the second major surface of the backplane; and
wherein circuitry within the number of fabric modules provides interconnections between the number of interface modules via the backplane.

15. The system of claim 14, wherein:
the major surface of the number of interface modules do not have a connector thereon that mates with a corresponding connector of the backplane;
the number of minor surfaces of the number of fabric modules do not have a connector thereon that mates with a corresponding connector of the backplane; and
wherein the circuitry within the number of fabric modules includes switching fabric logic.

* * * * *